(12) United States Patent
Yang et al.

(10) Patent No.: US 11,061,670 B2
(45) Date of Patent: Jul. 13, 2021

(54) DUAL-INTERFACE FLASH MEMORY CONTROLLER WITH EXECUTE-IN-PLACE CACHE CONTROL

(71) Applicant: Marvell Asia Pte, Ltd. (Registration No. 199702379M), Singapore (SG)

(72) Inventors: Ying Yang, Shanghai (CN); Ken Yeung, Cupertino, CA (US); Nelson Xu, San Jose, CA (US); Tung-hao Huang, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 15/929,237

(22) Filed: Mar. 4, 2020

(65) Prior Publication Data

US 2020/0285465 A1 Sep. 10, 2020

Related U.S. Application Data

(60) Provisional application No. 62/814,165, filed on Mar. 5, 2019.

(51) Int. Cl.
*G06F 9/22* (2006.01)
*G06F 3/06* (2006.01)
(Continued)

(52) U.S. Cl.
CPC ............ *G06F 9/22* (2013.01); *G06F 3/061* (2013.01); *G06F 3/0659* (2013.01); *G06F 3/0679* (2013.01); *G06F 12/126* (2013.01); *G06F 21/602* (2013.01); *G06F 9/3802* (2013.01); *G06F 2212/1032* (2013.01)

(58) Field of Classification Search
CPC ......................................................... G06F 9/22
See application file for complete search history.

(56) References Cited

U.S. PATENT DOCUMENTS

2016/0239422 A1* 8/2016 Talukdar ............. G06F 12/0846
2019/0122007 A1* 4/2019 Van Antwerpen ...... G06F 21/79

OTHER PUBLICATIONS

Jansen, W., et al., *Guidelines on PDA Forensics: Recommendations of the National Institute of Standards and Technology*, National Institute of Standards and Technology Special Publication 800-72 (Nov. 2004).

(Continued)

*Primary Examiner* — Sisley N Kim (57) ABSTRACT

A Flash memory controller for a system having first and second microcontrollers configured to perform first and second functions, and further having a Flash memory medium shared by the two microcontrollers, includes first and second execute-in-place cache controllers respectively configured to cache program code retrieved from the Flash memory for execution by the respective microcontrollers. A cache-miss arbiter controls access by the microcontrollers to the Flash memory on occurrence of a cache miss in one of the cache controllers. The arbiter may allow aborting of a first fetching operation on behalf of one of the microcontrollers upon receipt of a fetch request from the other microcontroller if the first fetching operation has retrieved a desired data unit and a threshold amount of data. The Flash memory controller may also include a decryption engine configured to decrypt encrypted program code. The decryption mode is determined from address ranges.

23 Claims, 5 Drawing Sheets

(51) Int. Cl.
*G06F 12/126* (2016.01)
*G06F 21/60* (2013.01)
*G06F 9/38* (2018.01)

(56) References Cited

OTHER PUBLICATIONS

Benavides, T., et al., "The Enabling of an Execute-In-Place Architecture to Reduce the Embedded System Memory Footprint and Boot Time," *Journal of Computers*, vol. 3, No. 1, pp. 79-89 (Jan. 2008).
Atmel Corporation, "Execute in Place (XIP) with Quad SPI (QSPI) Interface—Application Note" (Jan. 2016).
Prophet, G., "Cache controller IP cuts power for execute-in-place flash memory," Dolphin Integration (Feb. 2017; accessed Jan. 25, 2021 at www.eenewsembedded.com/news/cache-controller-ip-cuts-power-execute-place-flash-memory).

* cited by examiner

DUAL-INTERFACE FLASH MEMORY CONTROLLER WITH EXECUTE-IN-PLACE CACHE CONTROL

CROSS REFERENCE TO RELATED APPLICATION

This disclosure claims the benefit of commonly-assigned U.S. Provisional Patent Application No. 62/814,165, filed Mar. 5, 2019, which is hereby incorporated by reference herein in its entirety.

FIELD OF USE

This disclosure relates to a Flash memory controller. More particularly, this disclosure relates to a Flash memory controller that provides access to the same Flash memory medium by two different microcontrollers or processors.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Some microcontroller-based systems execute program code that is retrieved from a Flash-type memory device. The need to retrieve the program code increases processor internal memory requirements and slows program launching. An execute-in-place (XIP) Flash memory controller provides a cache block in the controller itself to cache recently-used code blocks to reduce such latency in program launching. However, systems-on-chip (SoCs) with multiple processors or microcontrollers are becoming more common, and program-launching latency can affect each processor.

SUMMARY

According to implementations of the subject matter of this disclosure, a Flash memory controller for a microcontroller system having a first microcontroller configured to perform a first function and a second microcontroller configured to perform a second function, and further having a Flash memory medium shared by the first microcontroller and the second microcontroller, includes a first execute-in-place cache controller configured to cache program code retrieved from the Flash memory, for execution by the first microcontroller, and a second execute-in-place cache controller configured to cache program code retrieved from the Flash memory, for execution by the second microcontroller.

A first implementation of such a Flash memory controller may further include a cache-miss arbiter configured to control access by one of the first microcontroller and the second microcontroller, on occurrence of a cache miss in a respective one of the first execute-in-place cache controller and the second execute-in-place cache controller, for fetching program code for execution.

In such a first implementation, the cache-miss arbiter may be configured to provide equal access to the Flash memory by the first microcontroller and the second microcontroller on occurrence of respective cache misses in both of the first execute-in-place cache controller and the second execute-in-place cache controller. In particular, the Flash memory controller may be configured to provide equal access to the Flash memory by the first microcontroller and the second microcontroller using a round-robin arbitration scheme.

In the first implementation, the cache-miss arbiter may be configured to abort a fetching operation on behalf of a first one of the first microcontroller and the second microcontroller on receipt of a fetch request from another one of the first microcontroller and the second microcontroller when (a) data retrieved by the fetching operation of the first one of the first microcontroller and the second microcontroller includes, among the data retrieved, a desired data unit, and (b) the fetching operation of the first one of the first microcontroller and the second microcontroller has proceeded beyond a threshold. The threshold may be configurable at time of setup of the Flash memory controller.

In a variant, the threshold may indicate a minimum amount of data to be retrieved before an abort will be permitted. In such a variant, the Flash memory controller may be configured to set a plurality of valid bits for each cache line that is fetched, each bit in the plurality of valid bits representing a portion of the cache line that is being fetched, and the threshold may be a minimum number of bits in the plurality of valid bits.

In a second implementation of such a Flash memory controller, program code for execution by one of the first microcontroller and the second microcontroller is stored in encrypted form, and the Flash memory controller further comprises a decryption engine configured to decrypt the encrypted program code.

In such a second implementation, the decryption engine may be configured for on-the-fly decryption. Determination of the decryption mode is based on address ranges.

In a third implementation of such a Flash memory controller, at least one of the first execute-in-place cache controller and the second execute-in-place cache controller includes a cache data memory configured as a plurality of blocks, each respective block storing data from a respective way of all sets, and the Flash memory controller may be configured to, when reading the cache data memory, in a first clock cycle decode location of data to be read, except for identification of the way in which the data to be read is stored and, in a second clock cycle, decode the identification of the way in which the data to be read is stored.

A method according to implementations of the subject matter of this disclosure, for operating Flash memory in a microcontroller system having a first microcontroller configured to perform a first function and a second microcontroller configured to perform a second function, and further having a Flash memory medium shared by the first microcontroller and the second microcontroller for storing program code for execution, includes caching program code retrieved from the Flash memory for execution-in-place by the first microcontroller, and separately caching program code retrieved from the Flash memory for execution-in-place by the second microcontroller.

A first implementation of such a method further includes providing equal access to the Flash memory by the first microcontroller and the second microcontroller on occurrence of respective cache misses for fetching program code from the Flash memory for execution-in-place by the first microcontroller and fetching program code from the Flash memory for execution-in-place by the second microcontroller. Providing equal access may include using a round-robin arbitration scheme.

A second implementation of such a method may further include aborting a fetching operation on behalf of a first one of the first microcontroller and the second microcontroller on receipt of a fetch request from another one of the first microcontroller and the second microcontroller when (a) data retrieved by the fetching operation of the first one of the first microcontroller and the second microcontroller includes, among the data retrieved, a desired data unit, and (b) the fetching operation of the first one of the first microcontroller and the second microcontroller has proceeded beyond a threshold. The threshold may be configured at time of setup of the Flash memory controller.

The aborting may be performed only when a minimum amount of data indicated by the threshold has been retrieved. The method may further include setting a plurality of valid bits for each cache line that is fetched, each bit in the plurality of valid bits representing a portion of the cache line that is being fetched, wherein the threshold is a minimum number of bits in the plurality of valid bits.

A third implementation of such a method may further include storing program code for execution by one of the first microcontroller and the second microcontroller in encrypted form, and decrypting the encrypted program code upon execution-in-place. The method may further include performing the decrypting on-the-fly during execution-in-place. The method may further include determining a decryption mode based on address ranges.

A third implementation of such a method may further include configuring a cache data memory as a plurality of blocks, each respective block storing data from a respective way of all sets, and when reading the cache data memory, in a first clock cycle decoding location of data to be read, except for identification of the way in which the data to be read is stored and, in a second clock cycle, decoding the identification of the way in which the data to be read is stored.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

In accordance with implementations of the subject matter of this disclosure, a Flash memory controller with two (or more) separate execute-in-place cache controllers allows separate processors or microcontrollers to access a single Flash memory medium effectively simultaneously. The microcontrollers share the same Flash memory controller and the same physical Flash memory medium, which reduces required memory size. However, each microcontroller accesses the Flash memory through a respective independent cache controller, with each cache controller having its own cache memory with execute-in-place capability.

For example, a wireless interface SoC may include a microcontroller (such as a Cortex-M4 reduced-instruction-set microcontroller licensed by ARM Holdings of Cambridgeshire, England) for performing one or more user functions, as well a separate microcontroller (such as an ARM-9 reduced-instruction-set microcontroller licensed by ARM Holdings) for performing wireless operations. A Flash memory controller in accordance with implementations of the subject matter of this disclosure, for use with such an SoC, includes two separate execute-in-place (XIP) cache controllers—one for use with the wireless microcontroller, and one for use with the user function microcontroller.

In such implementations, an arbiter is provided to control access by the two (or more) cache controllers to the Flash memory medium when cache misses in respective ones of the cache controllers require that both (or at least two of the) microcontrollers fetch program code for execution from the Flash memory medium. The arbiter may be configured to provide equal access to the Flash memory medium by the cache controllers. For example, a round-robin arbitration scheme may be used. Alternatively, there may be situations where it is fairer to provide unequal access, an the arbiter may be configured to provide unequal access in such situations.

Conventionally, in cache operations, an entire cache line is fetched as part of any fetching operation, even though only part of the cache line may actually be needed by the microcontroller on whose behalf the fetching operation is initiated. However, in accordance with implementations of the subject matter of this disclosure, the arbiter may include an abort mechanism that allows a first fetch operation on behalf of one of the microcontrollers to be aborted if another of the microcontrollers requires a second fetch operation, so that the other microcontroller does not have to wait longer than necessary for the channel to be free for the second fetch operation to proceed. Such an abort mechanism would allow aborting of a first fetch operation in favor of a second fetch operation only if the portion of the cache line that has been fetched in the first fetch operation includes the data (i.e., the segment of program code, which may be referred to for purposes of this discussion as the "critical word," although it may include more than one data word) that is actually needed by the microcontroller on whose behalf the first fetching operation was initiated.

Specifically, according to one implementation of such an abort mechanism, if a first fetching operation is initiated on behalf of one microcontroller, and a second fetching operation needs to be initiated on behalf of another microcontroller using the same read channel as the first fetching operation, aborting the first fetching operation in favor of the second fetching operation is not even considered if the critical word needed from the first fetching operation has not yet been retrieved from the Flash memory medium. However, if the critical word needed from the first fetching operation has been retrieved from the Flash memory medium, then according to this implementation of an abort mechanism, a predetermined threshold is examined and, if the predetermined threshold has been met, the first fetching operation is aborted in favor of the second fetching operation.

The predetermined threshold may represent a minimum amount of data—e.g., a minimum number of words—retrieved by the first fetching operation. The threshold is predetermined, in that it is set in advance. The threshold can be set at the time of device manufacture. Alternatively, in one implementation, the threshold can be field-configurable, and can be set at the time of device configuration.

For security, the program code stored in the Flash memory medium may be encrypted. In such an implementation, the arbiter may include a decryption engine—e.g., an AES decryption engine—for on-the-fly decryption of the program code as it is being fetched for delivery to the microcontroller for execution. Whether or not the fetched program code needs to be decrypted may be indicated using an address aliasing scheme. In one such scheme, one address range— e.g., a lower portion of the address range—may be used for clear program code data, while another address range—e.g., a higher portion of the address range—is used for encrypted program code data. In that scheme, the physical address is always in the lower address range. The next most significant bit in the address will indicate whether decryption is needed. Thus, the address will appear to be in a higher address range if decryption is needed (because the next most significant bit will be '1' to indicate decryption). Alternatively, '1' can be used to indicate no decryption, in which case the address can appear to be in a lower address range if decryption is needed.

Traditionally, there has been one "valid bit" per cache line. However, as noted above in connection with the abort mechanism, in implementations according to the subject matter of this disclosure each word of a cache line is validated as it is fetched (because fetching of the complete line might be aborted). As a result, there are many more "valid bits" in the tag data for each cache line. In one implementation, there are eight words per cache line. Therefore, in that implementation, there are eight times as many "valid bits" than in a traditional implementation.

As a result, there is more address data to decode, and it may not be possible to decode all of the address data within one clock cycle as may be needed. Therefore, in accordance with further implementations of the subject matter of this disclosure, the cached program code data is stored in a manner similar to a multi-way associative cache (e.g., an 8-way associative cache in one implementation). The cache may be organized as 128 sets of eight 32-byte cache lines, for a total of 32 kB.

The cache may be reorganized logically as 8 "ways," with each nth line of each of the 128 sets being included in the nth way. That is, the zeroth line of each of the 128 sets is included in the zeroth way, the 1st line of each of the 128 sets is included in the first way, etc. Within one clock cycle, the tag data including all of the additional valid bits may not be able to be decoded in one clock cycle, resulting in a timing violation. Therefore, in accordance with implementations of the subject matter of this disclosure, in a first clock cycle, the tag data is decoded to yield all address information except the particular way, leaving a choice of eight possibilities. The remainder of the address data, signifying that choice among the eight ways, can be decoded in the next clock cycle.

The subject matter of this disclosure may be better understood by reference to FIGS. 1-5.

Figure 1:
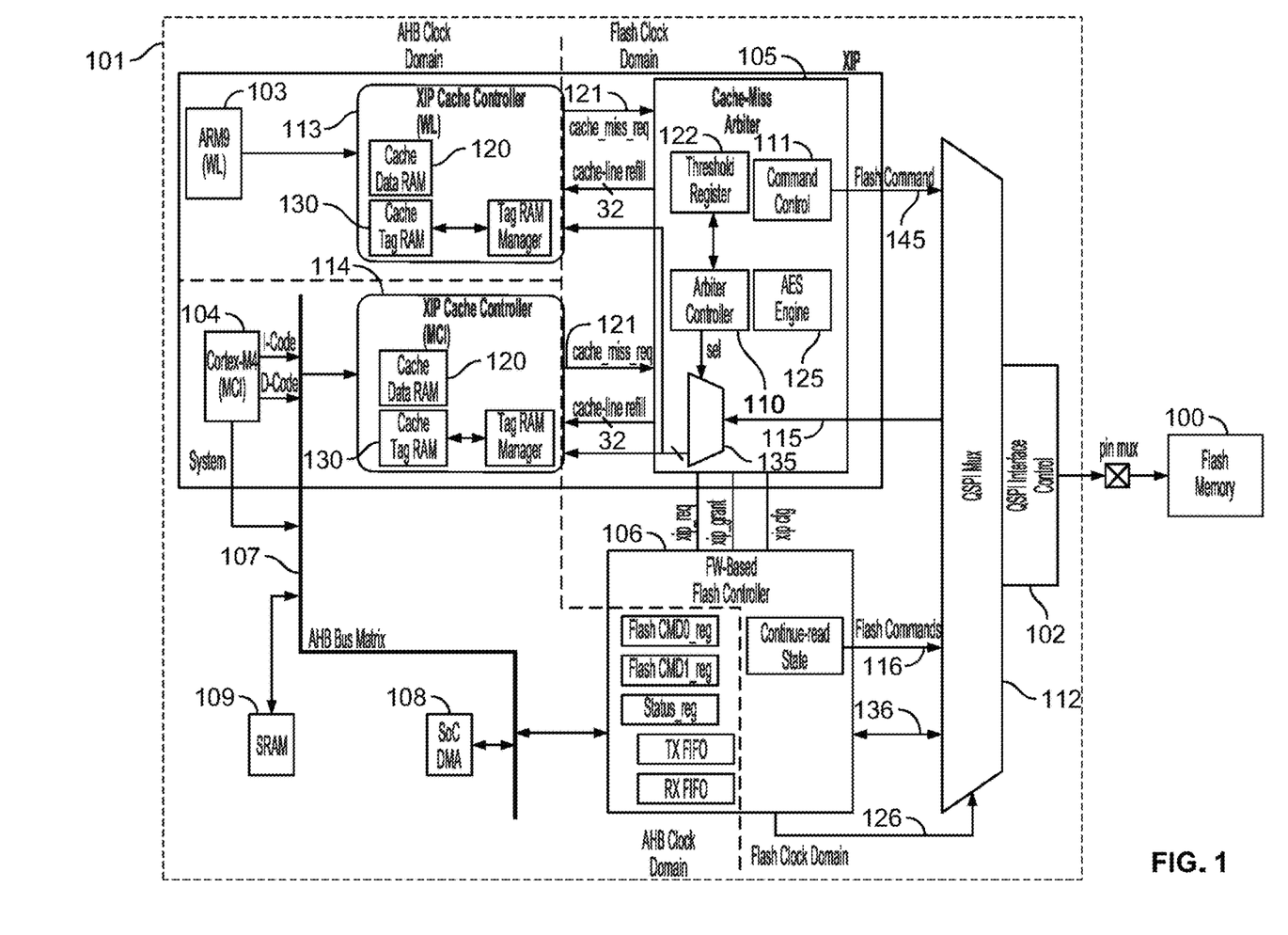
FIG. 1 is a top-level diagram of a Flash memory controller in accordance with implementations of the subject matter of this disclosure.

FIG. 1 is a top-level diagram of a Flash memory controller 101 in accordance with implementations of the subject matter of this disclosure. In this implementation, Flash memory controller 101 communicates with Flash memory medium 100 via Quad Serial Peripheral Interface (QSPI) module 102. QSPI module 102 receives Flash memory commands (e.g., to fetch data) from various other portions of Flash memory controller 101 via QSPI multiplexer 112. QSPI module 102 may be capable of operating in SPI mode, or in QSPI mode which does not require a controller.

In this implementation, QSPI module 102 is part of larger system-on-chip (SoC) (not shown in its entirety) that includes two microcontrollers. Microcontroller 103, which may be an ARM-9 reduced-instruction-set microcontroller licensed by ARM Holdings, is configured in this implementation to operate a wireless data link such as a Wi-Fi link. Microcontroller 104, which may be a Cortex-M4 reduced-instruction-set microcontroller licensed by ARM Holdings, is configured in this implementation to perform different functions such as user functions.

In this implementation, Flash memory controller 101 includes a first execute-in-place (XIP) cache controller 113 servicing microcontroller 103, and a second execute-in-place (XIP) cache controller 114 servicing microcontroller 104. Flash memory controller 101 also includes a cache-miss arbiter 105 to arbitrate between cache requests from XIP cache controller 113 and XIP cache controller 114.

In addition, Flash memory controller 101 also includes a firmware-based cache controller 106 that handles fetching of user data for use by microcontroller 104 to perform user functions, including large DMA requests. In that connection, firmware-based cache controller 106 is coupled to microcontroller 104 via bus 107 of the system-on-chip, which may be an Advanced Hi-Performance Bus (AHB) according to the Memory Card Interface standard. The AHB bus may also be coupled to a DMA module 108 and SRAM memory 109 of the SoC.

Firmware-based cache controller 106 sends Flash commands at 116 to Flash memory medium 100 via QSPI module 102, as selected by QSPI multiplexer 112 based on selection signal 126. Firmware-based cache controller 106 sends or receives data to or from Flash memory medium 100 in the same way, at 136.

When either microcontroller 103 or microcontroller 104 needs to execute program code, it searches respective cache 120 in XIP cache controller 113 or 114 to see if the needed code is in the respective cache 120. If the needed program code is in the respective cache 120, the code is retrieved and executed. If the needed program code is not in the respective cache 120, then a cache-miss signal is sent at 121 to cache-miss arbiter 105. If only one of microcontroller 103 or microcontroller 104 sends a cache-miss signal, then cache command unit 111 of cache-miss arbiter 105 simply passes on a request at 145 to Flash memory medium 100 via QSPI module 102, which fetches the requested code from Flash memory medium 100, and returns the requested code at 115. Multiplexer 135 returns the code to the correct one of microcontroller 103 and microcontroller 104 as directed by arbiter controller 110.

However, if both microcontroller 103 and microcontroller 104 need to execute program code, and neither microcontroller 103 nor microcontroller 104 finds the needed code in its respective cache 120, then both microcontroller 103 and microcontroller 104 will send a respective cache-miss signal at 121 to cache-miss arbiter 105. In such a case, according to implementations of the subject matter of this disclosure, cache-miss arbiter may be designed to provide equal access to fetch requests from both microcontroller 103 and microcontroller 104. Provision of such equal access may be accomplished using a simple round-robin protocol.

Once cache-miss arbiter 105 has given access to one of microcontroller 103 and microcontroller 104, and a fetch operation is being performed on behalf of that one of microcontroller 103 and microcontroller 104, then according to conventional cache operation, that fetch operation would continue, without interruption, until completion, and only then would a fetch operation be initiated on behalf of the other one of microcontroller 103 and microcontroller 104. However, in accordance with implementations of the subject matter of this disclosure, if a cache line fetch operation is underway on behalf of one of microcontroller 103 and microcontroller 104, that ongoing fetch operation can be interrupted or aborted, so that a second cache line fetch operation, on behalf of the other one of microcontroller 103 and microcontroller 104, can be initiated, if certain conditions are met.

Specifically, in accordance with implementations of the subject matter of this disclosure, an ongoing fetch operation on behalf of one microcontroller can be interrupted or aborted, so that a second cache line fetch operation can be initiated on behalf of a different microcontroller, if:

1. The critical word sought in the ongoing fetch operation has been retrieved; and
2. A threshold criterion has been met.

The threshold criterion may be that a certain number of words of the cache line being fetched have been retrieved. The threshold can be configurable by a user in the field at the time of device setup ("user" does not necessarily mean the end-user at run time, but could be, e.g., an installer). One implementation of the threshold criterion includes a register 122 having a number of bits at least equal to the number of words in a cache line. Although the number of words in a cache line may differ among implementations, at setup time, the number of words is known. The threshold may be set by storing a '1' in each bit location up to the number of bit locations corresponding to the number of words that must be retrieved before an abort will be allowed. When a fetch request is received while another fetch request is in progress, arbiter controller 110, which keeps track of the number of words that have been fetched (as well as whether the critical word has been fetched), will compare the number of words that have been fetched to the number of bits in register 122 that have been set to '1', and will abort the existing fetch request in favor of the new fetch request only if the number of words that have been fetched at least equals the number of bits of register 122 that have been set to '1' (and the critical word is among those words that have been retrieved). Of course, in other implementations, the default value of the bits of register 122 could be '1', and the threshold could be set by setting the desired number of bits to '0'.

The size of register 122 should be equal to the largest number of words expected in any cache line. If in a particular user configuration the cache line has fewer words than that largest possible number of words, the extra bits in register 122 will simply go unused—i.e., will remain '0' (or '1' in alternative embodiments).

The abort mechanism may be implemented in arbiter controller 110 by a state machine (not shown) operating as follows:

1. In an initial state, wait for valid cache request from one of the microcontrollers
2. In a next state, attempt to read data from the cache and wait for hit or miss result
3. In the event of a miss, start new cache line data fetch request
4. In a next state, the cache line filling is ongoing, and additional requests are awaited
5. In a next state, another request is received and a hit or miss is awaited
6. In a next state, a cache miss request is received
7. In a next state it is determined whether the critical, or target, word has been received
8. In a next state, after the target word has been received, the number of words that have been received is compared to the threshold
9. In a next state, only after the number of words that have been received exceeds the threshold is an abort permitted In some implementations, the program code data in Flash memory medium 100 may be encrypted for security reasons. If so, the program code data once fetched must be decrypted before it can be executed by a respective one of microcontroller 103 and microcontroller 104. To facilitate such decryption, cache miss arbiter 105 may include a decryption engine 125, which may, in some implementations, operate according to the Advanced Encryption Standard (AES).

Decryption engine 125 will operate on-the-fly on encrypted fetched data as it passes through cache miss arbiter 105, storing the decrypted data to the cache 120, and/or returning it to whichever one of microcontroller 103 and microcontroller 104 made the fetch request, without latency. One way to achieve on-the-fly decryption is to use address aliasing. For example, the available address space may be twice the actual data space, and the most significant bit of the address is used to indicate whether or not the data is encrypted (i.e., whether or not decryption is needed).

Figure 2:
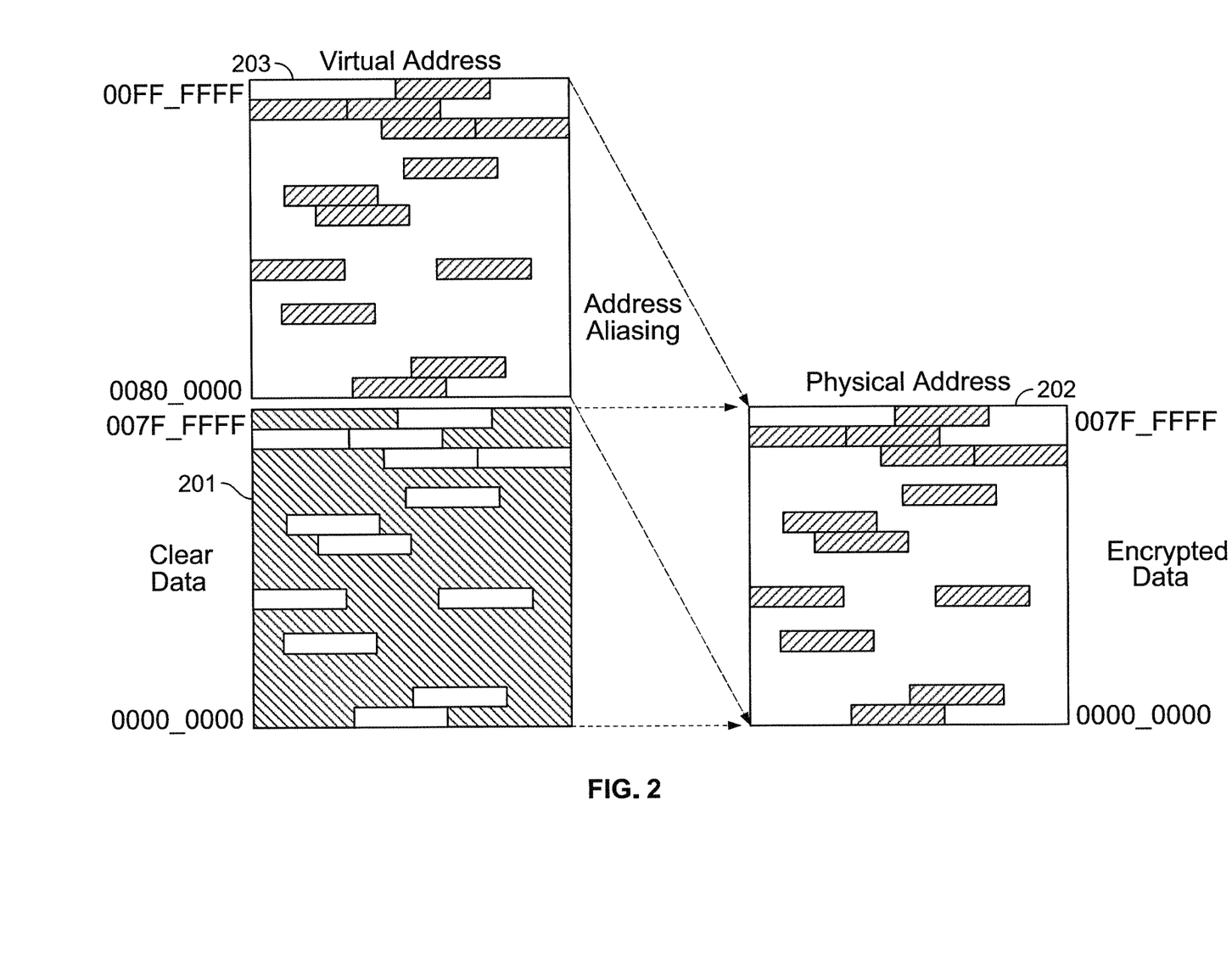
FIG. 2 is a diagram of address mapping for an address aliasing scheme in accordance with implementations of the subject matter of this disclosure.

As shown in FIG. 2, clear data 201 (indicated by diagonal hashing from the upper left to the lower right) and encrypted data 202 (indicated by diagonal hashing from the lower left to the upper right) are both stored in the lower address space. However, for encrypted data 202, the most significant bit of the address is set to '1' to indicate that decryption is needed, making it appear that encrypted data 202 is stored in an upper address space 203. Thus, in this implementation the address space appears to be divided into a lower half that is not encrypted (and does not require decryption), and an upper half that is encrypted (and requires decryption), while in fact all of the data—both clear and encrypted—resides in what appears to be the lower, clear, half of the address space. For example, if the data space encompasses twenty-three address bits [22:0], the data space appears to encompass twenty-four address bits [23:0], thereby appearing twice as large. However, the most-significant bit [23] does not actually represent a location, but rather whether or not decryption is required.

For each cache line, the retrieved data is stored in cache data RAM 120 along with address data in cache tag RAM 130 indicating from where in Flash memory medium 100 the data has been fetched. That address data is conventionally stored with a "valid bit" that is set once the cache line has been retrieved in full. However, as noted above in connection with the discussion of the cache line fetching abort mechanism, in accordance with implementations of this disclosure, each word is validated upon fetching, allowing the fetching process to be aborted if needed, as discussed above. Therefore, in implementations of the subject matter of this disclosure, instead of one valid bit per cache line, there are as many valid bits per cache line as there are words in a cache line. More generally, there may be a plurality of valid bits per cache line, while the number of valid bits may or may not be equal to the number of words in the cache line.

The presence of additional valid bits in the address data for a cache line increases the time necessary to decode the address when retrieving data from the cache. The additional decoding time may cause the total decoding time to exceed one clock cycle. Therefore, in accordance with implementations of the subject matter of this disclosure, the cache may be organized as a multi-way associative cache, and in a first clock cycle, all address data in cache tag RAM 130 except the way selection is decoded, leaving eight possible cache locations, with the way selection being decoded on the next clock cycle.

Figure 3:
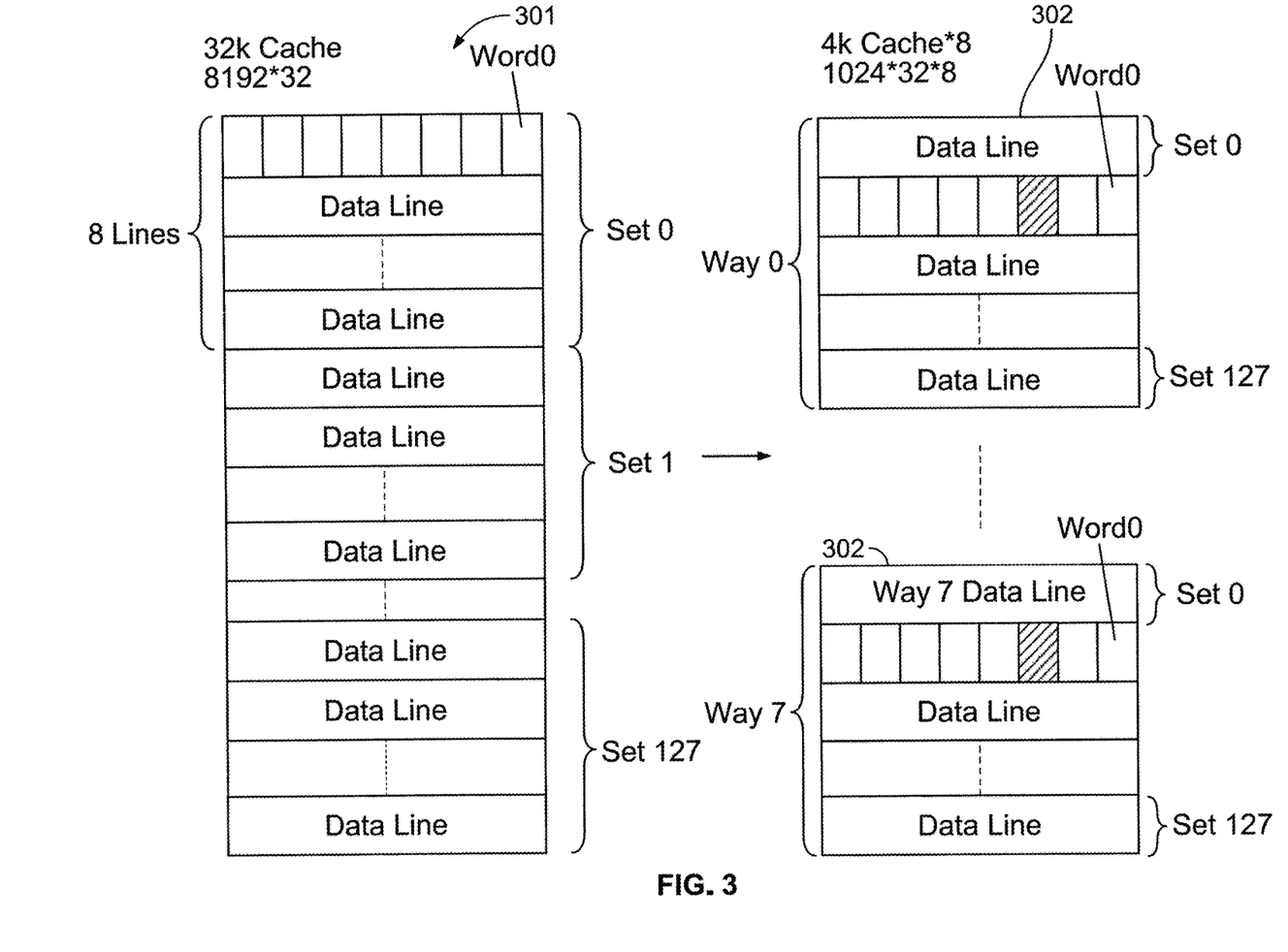
FIG. 3 is a diagram showing how a cache may be organized into ways in accordance with implementations of the subject matter of this disclosure.

For example, as shown in FIG. 3, a 32-kilobyte cache 301 may be divided into 128 sets (0, . . . , 127) each having eight lines. In order to break down the cache tag decoding into phases that can be accomplished within one clock cycle, cache 301 may be reorganized into eight blocks 302 (only two shown). Each nth block, or way, 302, includes the respective nth line of all sets (0, . . . , 127). That is, the zeroth way includes the 128 zeroth lines of all 128 sets (0, . . . 127); the first way includes the 128 first lines of all 128 sets (0, . . . 127); the second way includes the 128 second lines of all 128 sets (0, . . . 127); the third way includes the 128 third lines of all 128 sets (0, . . . 127); the fourth way includes the 128 fourth lines of all 128 sets (0, . . . 127); the fifth way includes the 128 fifth lines of all 128 sets (0, . . . 127); the sixth way includes the 128 sixth lines of all 128 sets (0, . . . 127); and the seventh way includes the 128 seventh lines of all 128 sets (0, . . . 127).

When decoding the tag data for a cache organized as at 302, in a first clock cycle, all address data but the way selection is decoded. Thus, it is known after the first clock cycle, that the data being sought is the mth word of the nth line of one of the eight blocks 302, highlighted by cross-hatching in FIG. 3. In the following clock cycle, the way selection is decoded, indicating which of the eight blocks holds the desired data (at its mth word of its nth line, in this example).

Figure 4:
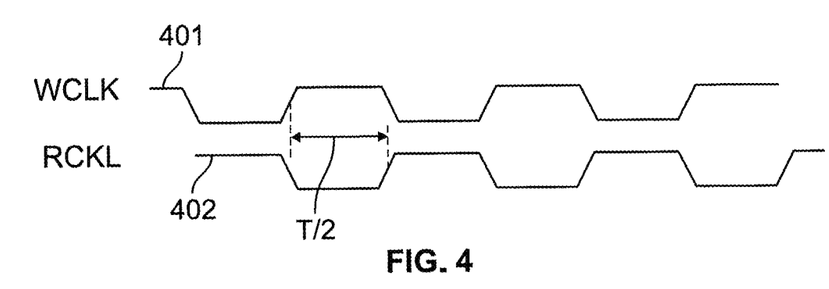
FIG. 4 is a timing diagram showing a write clock and a read clock in accordance with implementations of the subject matter of this disclosure.

The tag data may be stored, in some implementations, in a two-port synchronous register that may be written to and read from at the same address. The write clock and the read clock are traditionally identical but in order to avoid collisions, such registers normally require that the write and read clocks be offset from one another so that a mandated minimum offset exists between each rising edge of the write clock and the corresponding rising edge of the read clock. However, as shown in FIG. 4, in order to avoid such an offset, in implementations of the subject matter of this disclosure, instead of using identical write and read clocks, the write clock (WCLK) 401 and the read clock (RCLK) 402 are inverses of each other so that there is an inherent delay of T/2 (which is more than the mandated minimum offset) between a rising edge of the write clock and the corresponding rising edge of the read clock.

Figure 5:
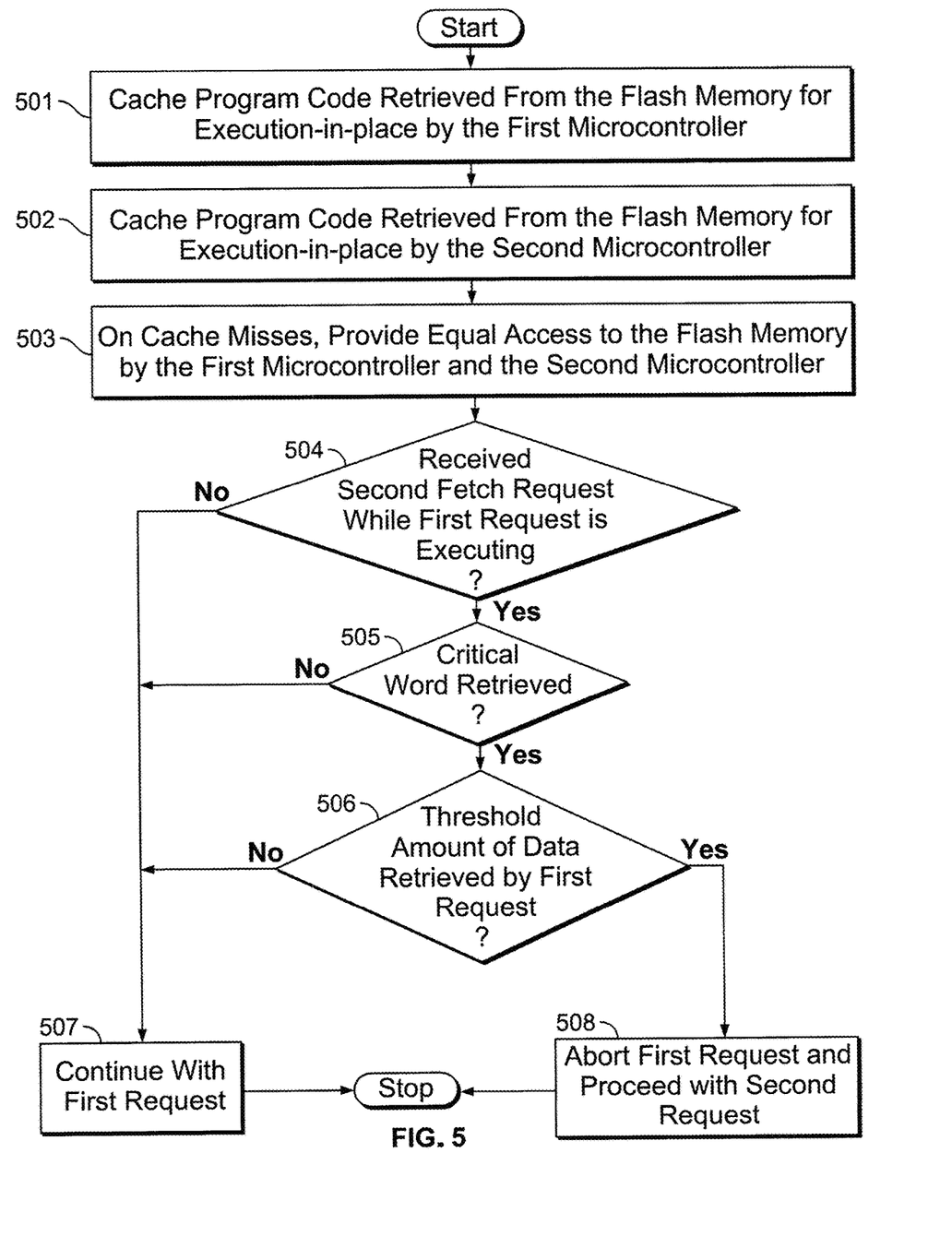
FIG. 5 is a flow diagram of a method according to implementations of the subject matter of this disclosure for operating a Flash memory controller.

A method 500 according to implementations of the subject matter of this disclosure is diagrammed in FIG. 5. At 501, program code retrieved from the Flash memory for execution-in-place by the first microcontroller is cached. Next, at 502, program code retrieved from the Flash memory for execution-in-place by the second microcontroller is cached. At 503, on cache misses, equal access to the Flash memory by the first microcontroller and the second microcontroller is provided. At 504, it is determined whether a second fetch request has been received while a first request is executing. If not, then at 507 the first request continues to execute. But if at 504 it is determined that a second fetch request has been received while the first request is executing, then at 505 it is determined whether the critical word—i.e., the data word that the respective microcontroller was actually seeking in the first request—has been retrieved. If not, then at 507 the first request continues to execute. But if at 505, it is determined that the critical word has already been retrieved, then at 506 it is determined whether a predetermined threshold amount of data has been retrieved by the first request. If not, then at 507 the first request continues to execute. But if at 506 it is determined that the predetermined threshold amount of data has been retrieved by the first request, then the first request is aborted and a second request begins to execute.

Thus it is seen that a Flash memory controller that provides access to the same Flash memory medium by two different microcontrollers or processors has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A Flash memory controller for a microcontroller system having a first microcontroller configured to perform a first function and a second microcontroller configured to perform a second function, and further having a Flash memory medium shared by the first microcontroller and the second microcontroller, the Flash memory controller comprising:
    a first execute-in-place cache controller configured to cache program code retrieved from the Flash memory medium, for execution by the first microcontroller directly from cache memory in the first execute-in-place cache controller; and
    a second execute-in-place cache controller configured to cache program code retrieved from the Flash memory medium, for execution by the second microcontroller directly from cache memory in the second execute-in-place cache controller.

2. The Flash memory controller of claim 1 further comprising a cache-miss arbiter configured to control access by one of the first microcontroller and the second microcontroller, on occurrence of a cache miss in a respective one of the first execute-in-place cache controller and the second execute-in-place cache controller, for fetching program code for execution.

3. The Flash memory controller of claim 2 wherein the cache-miss arbiter is configured to provide equal access to the Flash memory medium by the first microcontroller and the second microcontroller on occurrence of respective cache misses in both of the first execute-in-place cache controller and the second execute-in-place cache controller.

4. The Flash memory controller of claim 3 wherein the cache-miss arbiter is configured to provide equal access to the Flash memory medium by the first microcontroller and the second microcontroller using a round-robin arbitration scheme.

5. The Flash memory controller of claim 2 wherein the cache-miss arbiter is configured to abort a fetching operation on behalf of a first one of the first microcontroller and the second microcontroller on receipt of a fetch request from another one of the first microcontroller and the second microcontroller when:
    (a) data retrieved by the fetching operation of the first one of the first microcontroller and the second microcontroller includes, among the data retrieved, a desired data unit; and
    (b) the fetching operation of the first one of the first microcontroller and the second microcontroller has proceeded beyond a threshold.

6. The Flash memory controller of claim 5 wherein the threshold indicates a minimum amount of data to be retrieved before an abort will be permitted.

7. The Flash memory controller of claim 6 wherein the threshold is configurable at time of setup of the Flash memory controller.

8. The Flash memory controller of claim 6, wherein:
the Flash memory controller is configured to set a plurality of valid bits for each cache line that is fetched, each bit in the plurality of valid bits representing a portion of the cache line that is being fetched; and
the threshold is a minimum number of bits in the plurality of valid bits.

9. The Flash memory controller of claim 1 wherein:
program code for execution by one of the first microcontroller and the second microcontroller is stored in encrypted form; and
the Flash memory controller further comprises a decryption engine configured to decrypt the encrypted program code.

10. The Flash memory controller of claim 9 wherein the decryption engine is configured for on-the-fly decryption.

11. The Flash memory controller of claim 10 wherein determination of decryption mode is based on address ranges.

12. The Flash memory controller of claim 1 wherein:
at least one of the first execute-in-place cache controller and the second execute-in-place cache controller comprises a cache data memory configured as a plurality of blocks, each respective block storing data from a respective way of all sets; and
the Flash memory controller is configured to, when reading the cache data memory, in a first clock cycle decode location of data to be read, except for identification of the way in which the data to be read is stored and, in a second clock cycle, decode the identification of the way in which the data to be read is stored.

13. A method of operating Flash memory in a microcontroller system having a first microcontroller configured to perform a first function and a second microcontroller configured to perform a second function, and further having a Flash memory medium shared by the first microcontroller and the second microcontroller for storing program code for execution, the method comprising:
caching program code retrieved from the Flash memory medium for execution-in-place by the first microcontroller directly from cache memory in the first execute-in-place cache controller; and
separately caching program code retrieved from the Flash memory medium for execution-in-place by the second microcontroller directly from cache memory in the second execute-in-place cache controller.

14. The method of claim 13 further comprising providing equal access to the Flash memory medium by the first microcontroller and the second microcontroller on occurrence of respective cache misses for fetching program code from the Flash memory for execution-in-place by the first microcontroller and fetching program code from the Flash memory medium for execution-in-place by the second microcontroller.

15. The method of claim 14 wherein the providing equal access comprises using a round-robin arbitration scheme.

16. The method of claim 13 further comprising aborting a fetching operation on behalf of a first one of the first microcontroller and the second microcontroller on receipt of a fetch request from another one of the first microcontroller and the second microcontroller when:
(a) data retrieved by the fetching operation of the first one of the first microcontroller and the second microcontroller includes, among the data retrieved, a desired data unit; and
(b) the fetching operation of the first one of the first microcontroller and the second microcontroller has proceeded beyond a threshold.

17. The method of claim 16 wherein the aborting is performed only when a minimum amount of data indicated by the threshold has been retrieved.

18. The method of claim 17 further comprising configuring the threshold at time of setup of the Flash memory controller.

19. The method of claim 17 further comprising:
setting a plurality of valid bits for each cache line that is fetched, each bit in the plurality of valid bits representing a portion of the cache line that is being fetched; wherein:
the threshold is a minimum number of bits in the plurality of valid bits.

20. The method of claim 13 further comprising:
storing program code for execution by one of the first microcontroller and the second microcontroller in encrypted form; and
decrypting the encrypted program code upon execution-in-place.

21. The method of claim 20 further comprising performing the decrypting on-the-fly during execution-in-place.

22. The method of claim 21 further comprising determining a decryption mode based on address ranges.

23. The method of claim 13 further comprising:
configuring a cache data memory as a plurality of blocks, each respective block storing data from a respective way of all sets; and
when reading the cache data memory, in a first clock cycle decoding location of data to be read, except for identification of the way in which the data to be read is stored and, in a second clock cycle, decoding the identification of the way in which the data to be read is stored.

* * * * *